US012583243B2

(12) United States Patent
Nihashi

(10) Patent No.: US 12,583,243 B2
(45) Date of Patent: Mar. 24, 2026

(54) PRINTER

(71) Applicant: Toshiba Tec Kabushiki Kaisha, Tokyo (JP)

(72) Inventor: Kiyotaka Nihashi, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 144 days.

(21) Appl. No.: 18/403,888

(22) Filed: Jan. 4, 2024

(65) Prior Publication Data

US 2024/0359490 A1 Oct. 31, 2024

(30) Foreign Application Priority Data

Apr. 25, 2023 (JP) ................................ 2023-071613

(51) Int. Cl.
*B41J 15/16* (2006.01)
*B41J 3/407* (2006.01)
*B41J 15/02* (2006.01)
*B41J 15/04* (2006.01)

(52) U.S. Cl.
CPC ........... *B41J 15/165* (2013.01); *B41J 3/4075* (2013.01); *B41J 15/02* (2013.01); *B41J 15/04* (2013.01)

(58) Field of Classification Search
CPC . B41J 15/165; B41J 15/02; B41J 15/04; B41J 3/4075; B41J 11/00; B41J 11/0005; B41J 11/001; B41J 11/002; B41J 11/0022; B41J 11/0045; B41J 11/42; B41J 11/44; B41J 11/005; B41J 11/0055; B41J 11/007; B41J 11/0065; B41J 11/006; B41J 11/0085; B41J 11/53; B41J 11/52; B41J 11/54; B41J 11/55
See application file for complete search history.

(56) References Cited

U.S. PATENT DOCUMENTS

| | | | |
|---|---|---|---|
| 2004/0140387 A1 | 7/2004 | Ishida et al. | |
| 2019/0152240 A1 | 5/2019 | Teh et al. | |

FOREIGN PATENT DOCUMENTS

| | | | |
|---|---|---|---|
| JP | H08-151149 A | 6/1996 | |
| JP | H08151149 * | 6/1996 | ............. B41J 15/04 |
| JP | 2000-016651 A | 1/2000 | |
| JP | 2004155533 A | 6/2004 | |
| JP | 2010-208319 A | 9/2010 | |

OTHER PUBLICATIONS

Extended European Search Report mailed May 13, 2024 in corresponding European Patent Application No. 24154237.2, 7 pages.
Notice of Reasons for Refusal (First Office Action) mailed Oct. 14, 2025 in corresponding Japanese Patent Application No. 2023-071613 with English machine translation, 6 pages.

* cited by examiner

*Primary Examiner* — Kristal Feggins
(74) *Attorney, Agent, or Firm* — Kim & Stewart LLP

(57) ABSTRACT

According to an embodiment, a printer includes a damper that moves towards a continuous sheet by a predetermined distance and applies a tensile force to the continuous sheet on a conveying path on which the continuous sheet is conveyed by the feed roller. The printer further includes a limiter that switches a state of the damper between an unlimited state in which a movement distance for the damper is not limited and a limited state in which the movement distance for the damper is limited so that no tensile force is applied to the continuous sheet.

16 Claims, 11 Drawing Sheets

PRINTER

CROSS-REFERENCE TO RELATED APPLICATIONS

This application is based upon and claims the benefit of priority from the prior Japanese Patent Application No. 2023-71613, filed on Apr. 25, 2023, the entire contents of which are incorporated herein by reference.

FIELD

Embodiments described herein generally relate to a printer.

BACKGROUND

Conventionally, a linerless label printer includes a damper. Although the linerless label sheet is released and fed from roll paper, a large force is required for separating the linerless label sheet from the roll paper. A damper that applies a tensile force to a sheet released from roll paper prevents a printing failure which would occur when the sheet cannot be suitably fed to a printing head. Moreover, the damper mechanism is also effective in a case of using roll paper with a large diameter, which requires a large force for releasing it due to the inertia.

In a case where a label sheet with a label attached to a base sheet is used in a printer with such a damper mechanism, label detachment occurs. A cutter for cutting the label sheet is located on a more downstream side in the sheet conveying direction than the printing head. Therefore, in a case where the cutter is at a long distance from the printing head, after the label sheet is cut between a printed label and a label adjacent to the printed label, it is necessary to return the adjacent label to a position where the adjacent label can be printed. At this time, the label is in some cases detached at a position on the sheet which is curved by the damper.

DETAILED DESCRIPTION

Figure 1:
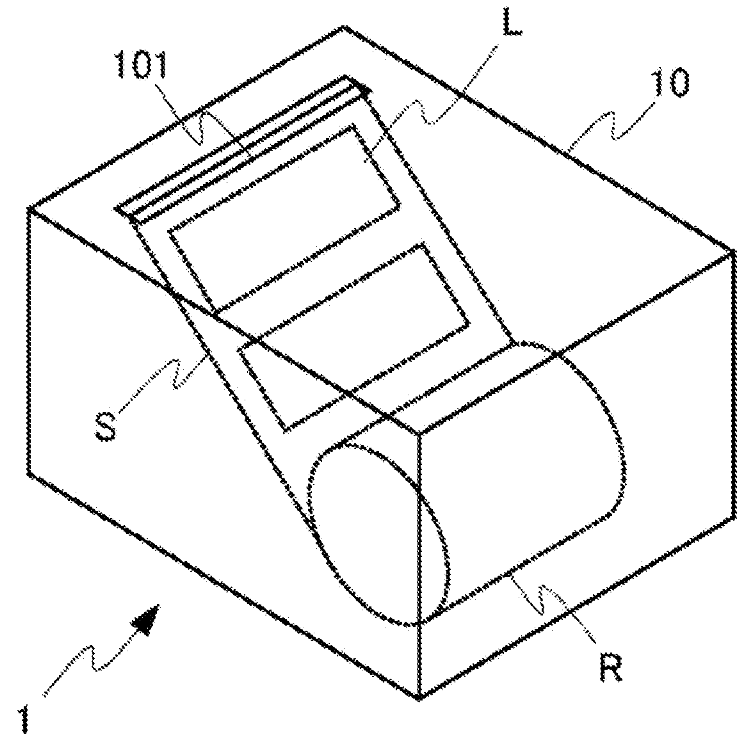
FIG. 1 is a schematic perspective view showing a printer that houses roll paper according to an embodiment.

In accordance with one embodiment, a printer includes a print head, a feeding roller, a damper, and a limiter. The printing head prints a continuous sheet released from a roll around which the continuous sheet is wound. The feed roller conveys the continuous sheet via the printing head. The damper moves towards the continuous sheet by a predetermined distance and applies a tensile force to the continuous sheet on a conveying path for the continuous sheet conveyed by the feed roller. In addition, the limiter switches a state of the damper between an unlimited state in which a movement distance for the damper is not limited and a limited state in which the movement distance for the damper is limited so that no tensile force is applied to the continuous sheet.

Hereinafter, embodiments will be described with reference to the drawings. In the drawings, the same configurations will be denoted by the same reference signs.

(Configuration of Printer)

Figure 2:
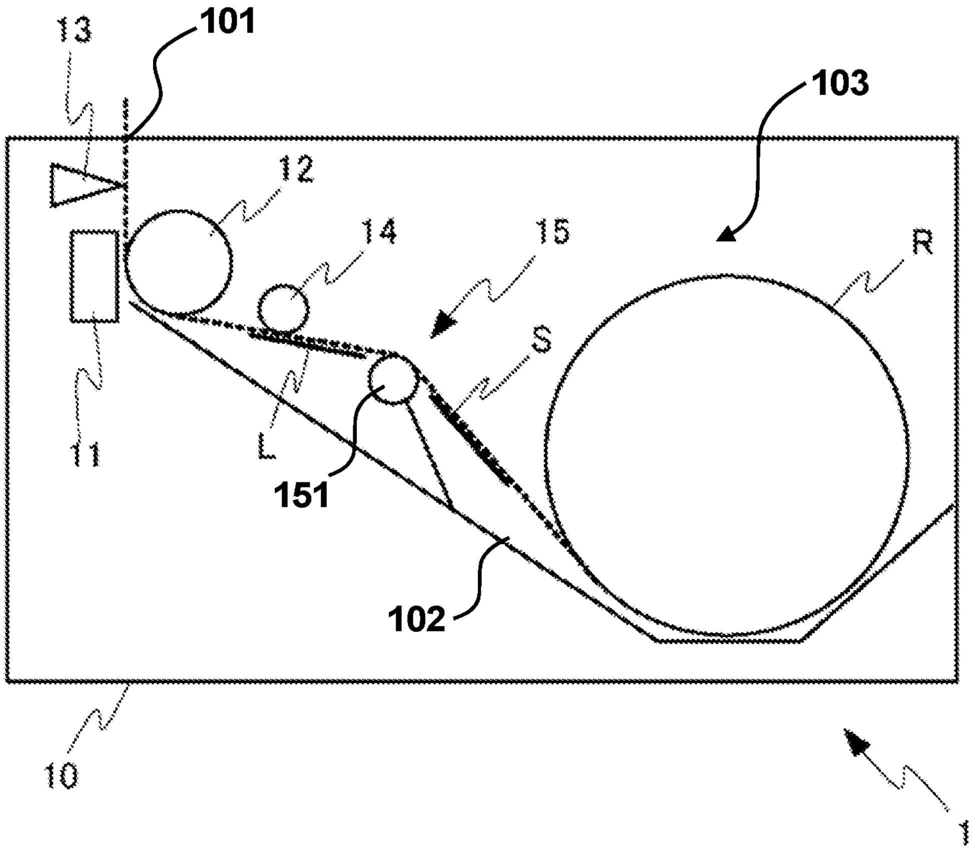
FIG. 2 is a schematic side view showing an internal configuration of the printer according to the embodiment.

A configuration of a printer according to the present embodiment will be described. FIG. 1 is a schematic perspective view showing the printer that houses roll paper according to the present embodiment. FIG. 2 is a schematic side view showing an internal configuration of the printer according to the present embodiment.

As shown in FIGS. 1 and 2, a printer 1 according to the present embodiment is a thermal printer. The printer 1 has a linerless label printing mode and a label printing mode as printing modes. The linerless label printing mode is a mode for printing on a linerless label sheet released from roll paper R. The label printing mode is a mode for performing printing on a label L attached to a base sheet S (label sheet) released from the roll paper R. The printing mode is changed, for example, by a user's operation in accordance with whether the roll paper R housed in the printer 1 is roll paper around which the linerless label sheet is wound or roll paper around which the base sheet S is wound. As shown in FIGS. 1 and 2, the printer 1 includes a casing 10, a printing head 11, a platen roller 12, a cutter 13, an auxiliary roller 14, a damper 15, and a limiter 16 (see FIGS. 6 and 7).

The casing 10 has a housing space 103 which is formed in a substantially box shape and houses the above-mentioned components and the roll paper R. The casing 10 includes, in a part of its upper surface, a delivery port 101 for delivering a printed sheet. The roll paper R shown in the figure is one with the base sheet S wound around a core (not shown) for example. The base sheet S is a continuous sheet to which a plurality of labels L are continuously attached at intervals. The label L is heat-sensitive paper with an adhesive applied to one surface. In the following description, the side on which the label L is attached will be referred to as a top surface of the base sheet S. Moreover, the back of the side on which the label L is attached will be referred to as a back surface of the base sheet S.

The printing head 11 shown in FIG. 2 has a plurality of heat elements which is provided near the delivery port 101 and adjacent to each other in the width direction of the label L. The plurality of heat elements generates heat in accordance with input pulse waves. This configuration enables the printing head 11 to form (print) an image on the label L. The platen roller 12 is a feed roller provided so as to press the label L to the printing head 11 from the back of the base sheet S. By being driven to rotate, the platen roller 12 conveys the base sheet S released from the roll paper R so as to be delivered from the delivery port 101.

The cutter 13 shown in FIG. 2 is provided nearer the delivery port 101 than the printing head 11, i.e., on a more downstream side in the conveying direction than the printing head 11. The cutter 13 cuts the base sheet S between a label L printed by the printing head 11 and a label L continuous to such a label L. The damper 15 shown in FIG. 2 is provided between the roll paper R and the platen roller 12 in the conveying direction for the base sheet S. The damper 15 applies a tensile force the base sheet S between the roll paper R and the platen roller 12 by pressing the base sheet S from the top surface. It should be noted that the damper 15 will be described later in detail together with the limiter 16.

The auxiliary roller 14 shown in FIG. 2 is provided between the press position for the base sheet S by the damper 15 and the platen roller 12. The auxiliary roller 14 is held in contact with the back of the base sheet S pressed by the damper 15 and assists application of a tensile force by the damper 15.

(Configurations of Damper and Limiter)

Figure 3:
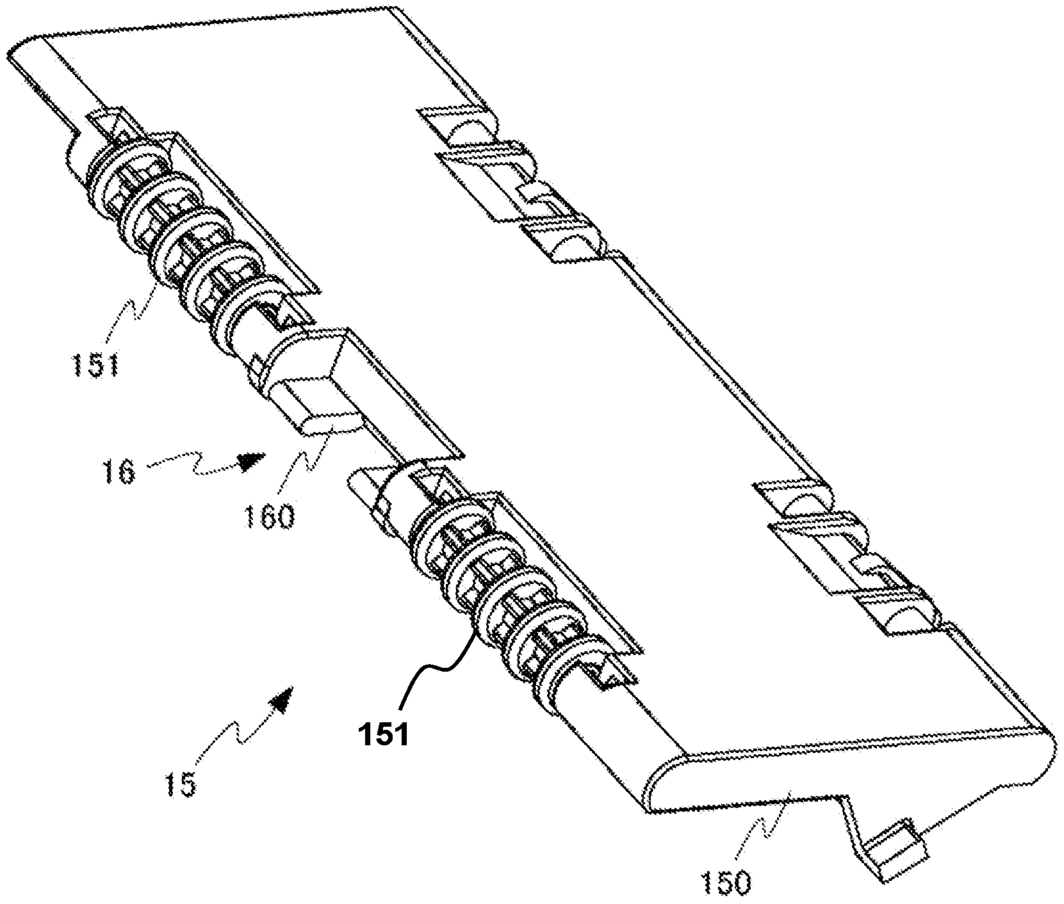
FIG. 3 is a perspective view showing an upper configuration of a damper according to the embodiment.
Figure 4:
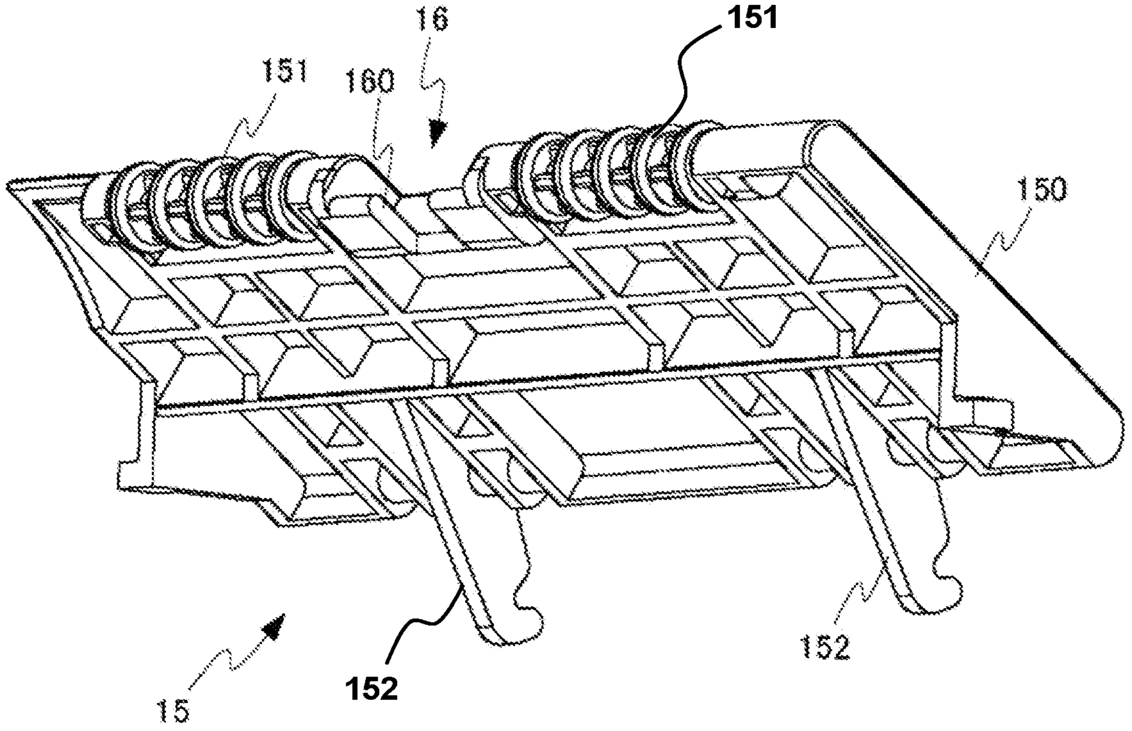
FIG. 4 is a perspective view showing a lower configuration of a damper according to the embodiment.
Figure 5:
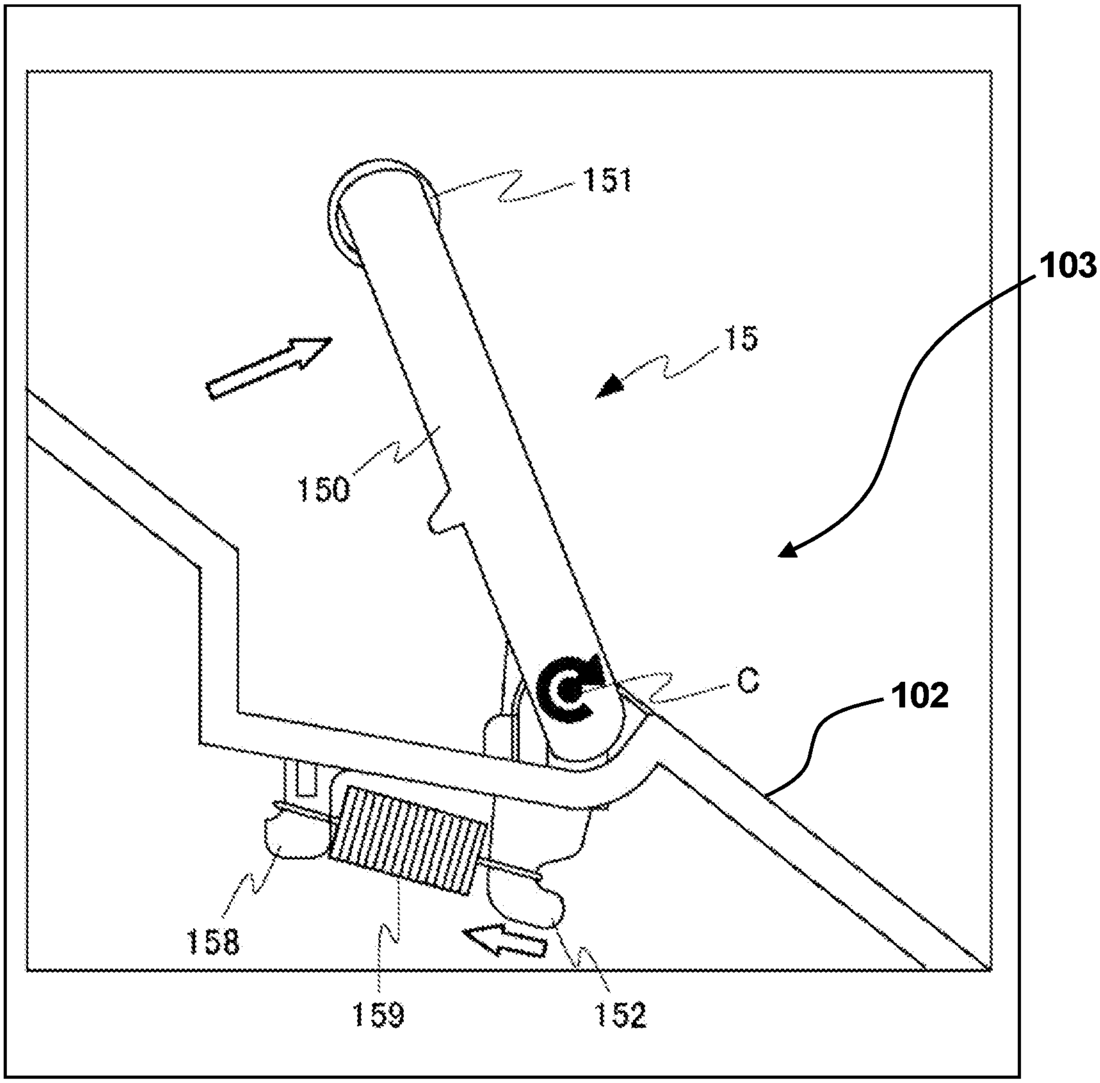
FIG. 5 is a schematic side view showing the damper biased by an extension spring according to the embodiment.
Figure 6:
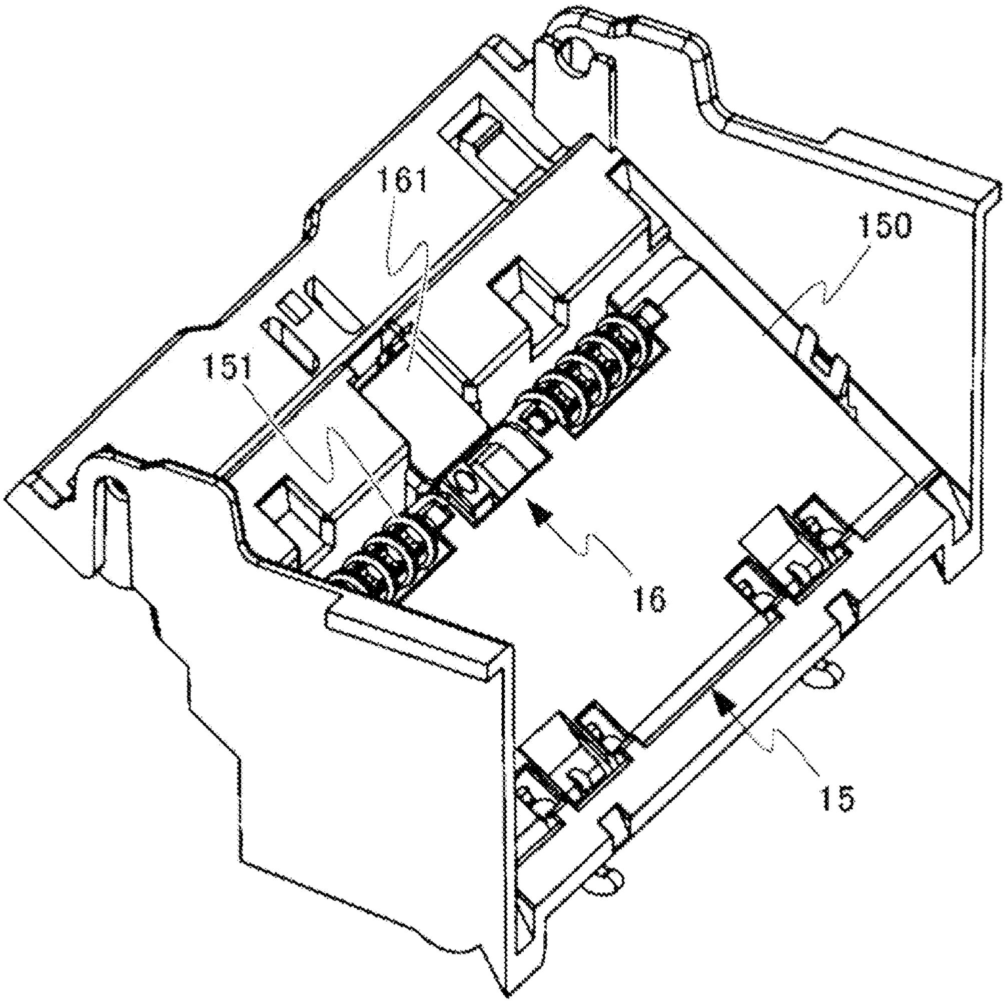
FIG. 6 is a perspective view showing the damper in a limited state according to the embodiment.
Figure 7:
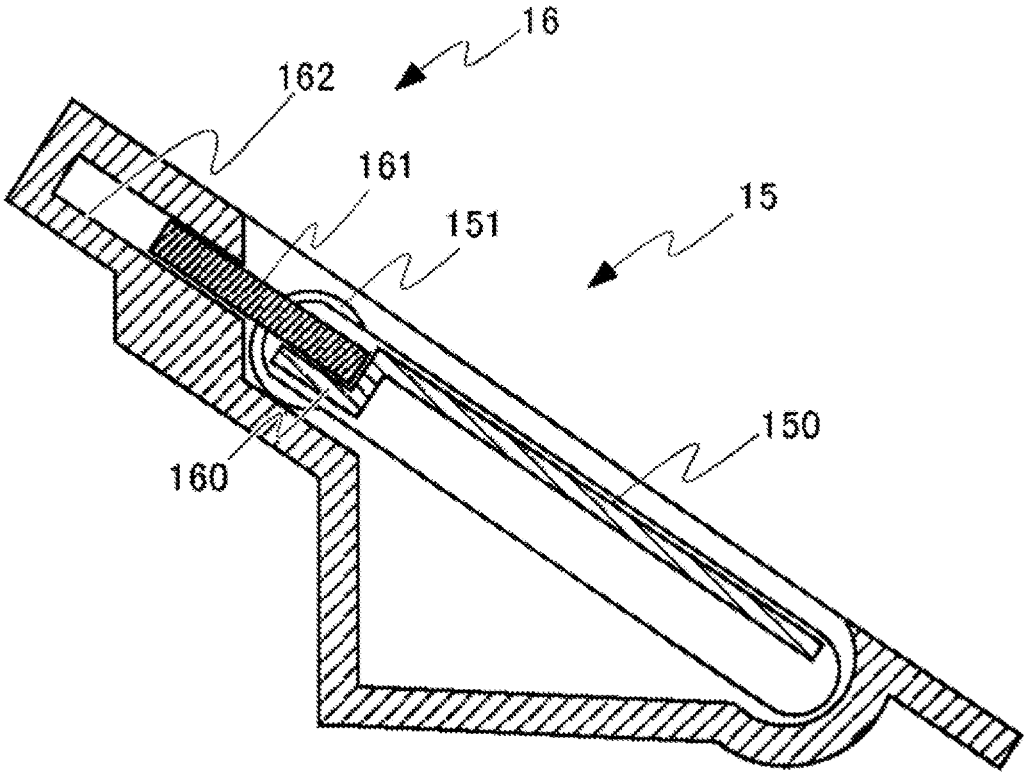
FIG. 7 is a side cross-sectional view showing the damper in the limited state according to the embodiment.
Figure 8:
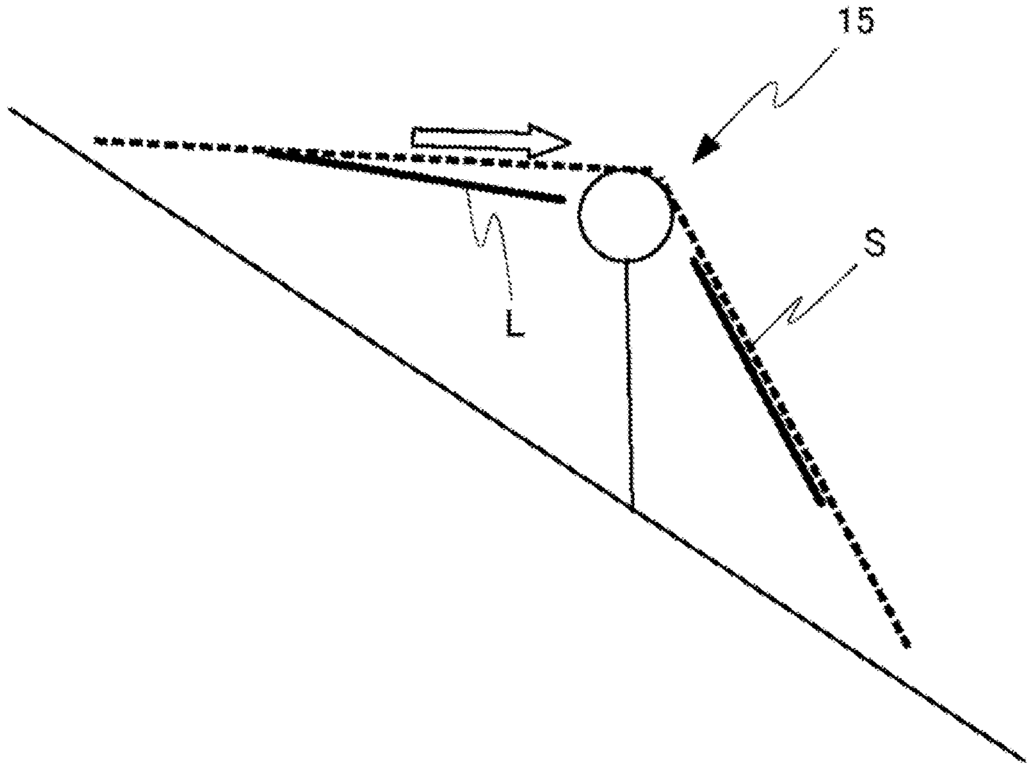
FIG. 8 is a schematic diagram showing a label sheet to which a tensile force is applied by the damper in an unlimited state according to the embodiment.
Figure 9:
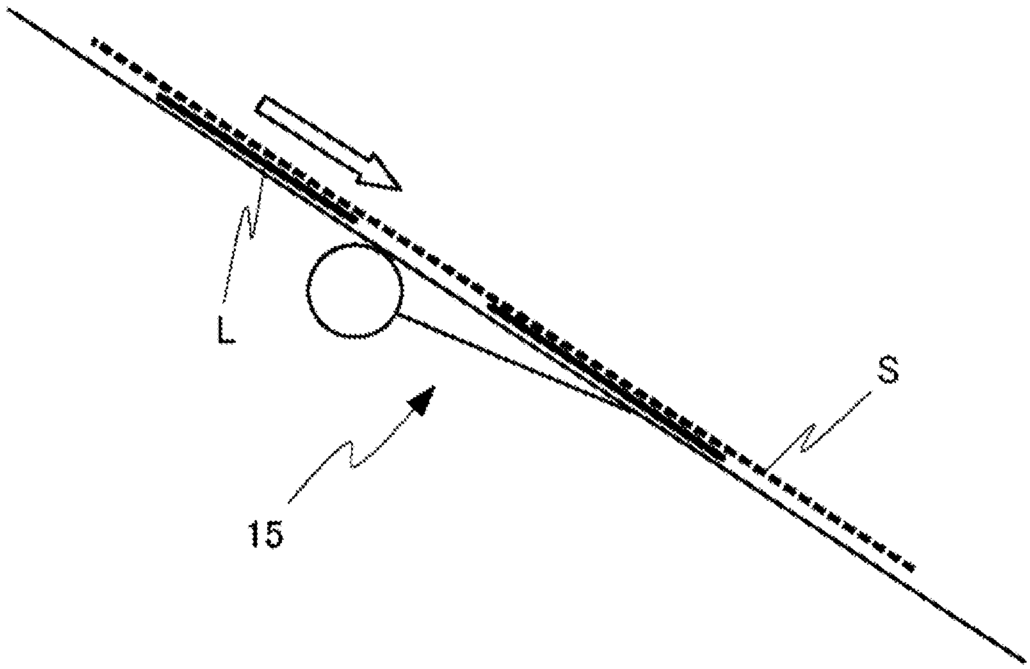
FIG. 9 is a schematic diagram showing the label sheet to which no tensile force is applied by the damper in the limited state according to the embodiment.

Configurations of the damper 15 and the limiter 16 according to the present embodiment will be described. FIGS. 3 and 4 are respectively an upper perspective view and a lower perspective view showing the configuration of the damper 15 according to the present embodiment. FIG. 5 is a schematic side view showing the damper 15 which is biased by extension springs 159 in the present embodiment. FIGS. 6 and 7 are respectively a perspective view and a cross-sectional side view showing the damper 15 in a limited state according to the present embodiment. FIG. 8 is a schematic diagram showing the label sheet to which a tensile force is applied by the damper 15 in an unlimited state according to the present embodiment. FIG. 9 is a schematic diagram showing the label sheet to which no tensile force is applied by the damper in the limited state according to the present embodiment. It should be noted that for the sake of description, the limiter 16 is omitted from FIG. 5 and levers 152 are omitted from FIG. 7.

As shown in FIGS. 3 and 4, the damper 15 includes a main body 150, two roller groups 151, and two levers 152. The main body 150 is substantially plate-like member formed with a large width corresponding to the width of the base sheet S. The two roller groups 151 are provided, spaced apart from each other in the width direction, at one end portion in a direction orthogonal (orthogonal direction) to the width direction of the main body 150. The two roller groups 151 each have a plurality of rollers.

As shown in FIG. 4, the two levers 152 are provided, spaced apart from each other in the width direction, at the other end portion in the orthogonal direction of the main body 150. Moreover, as shown in FIG. 5, the main body 150 is provided to be capable of swinging around a rotation shaft C in the vicinity of the other end portion with respect to a bottom wall 102 forming the housing space 103 of the casing 10. The two levers 152 penetrate the bottom wall 102 forming the housing space 103 of the casing 10 in a state in which the main body 150 is attached within the casing 10. Two mounting portions 158 respectively corresponding to the two levers 152 are provided on the back side of the bottom wall 102, i.e., on a surface opposite to a surface on which the housing space 103 is formed.

As shown in FIG. 5, the two levers 152 are respectively coupled to the corresponding two mounting portions 158 through the extension springs 159. Accordingly, the damper 15 is constantly biased by the extension springs 159 so as to swing in the clockwise direction in FIG. 5 and presses the base sheet S between the auxiliary roller 14 and the roll paper R. At this time, the two roller groups 151 of the damper 15 are held in contact with the top surface of the base sheet S, and friction produced on the damper 15 and the base sheet S is accordingly reduced.

As shown in FIGS. 3, 4, 6, and 7, the limiter 16 includes a locked portion 160 and a locking portion 161. the locked portion 160 is provided between the two roller groups 151 at the one end portion in the orthogonal direction in the main body 150 of the damper 15. The locked portion 160 is a step portion that engages with the locking portion 161 to be capable of locking the damper 15 when the damper 15 swings in a biasing direction of the extension springs 159.

As shown in FIGS. 6 and 7, the locking portion 161 is a substantially plate-like member which is guided to be movable in the radial direction of the rotation shaft C by guide portions 162 formed as two slots opposite to each other in the width direction of the damper 15. The locking portion 161 protrudes towards the rotation shaft C from the guide portions 162 so as to be positioned on the side in the biasing direction of the extension springs 159 with respect to the guide portions 162. When protruding from the guide portions 162, the locking portion 161 engages with the locked portion 160 and locks the damper 15 (see FIG. 7). At this time, the damper 15 enters the limited state in which the swing distance due to biasing of the extension springs 159 is limited so that the damper 15 does not press the base sheet S. On the other hand, in a case where the locking portion 161 is stored in the guide portions 162, does not engage with the locked portion 160, and does not lock the damper 15, the damper 15 enters the unlimited state in which the swing distance due to biasing of the extension springs 159 is not limited.

In a case where the damper 15 is in the unlimited state as shown in FIG. 8, the label L is detached near the press position by the damper 15 when the base sheet S is moved by the platen roller 12 in a direction opposite to the printing head 11. On the other hand, in a case where the damper 15 is in the limited state as shown in FIG. 9, detachment of the label L is prevented because the damper 15 applies no tensile force to the base sheet S when the base sheet S is moved in the opposite direction.

(Configuration and Operation of Control System)

Figure 10:
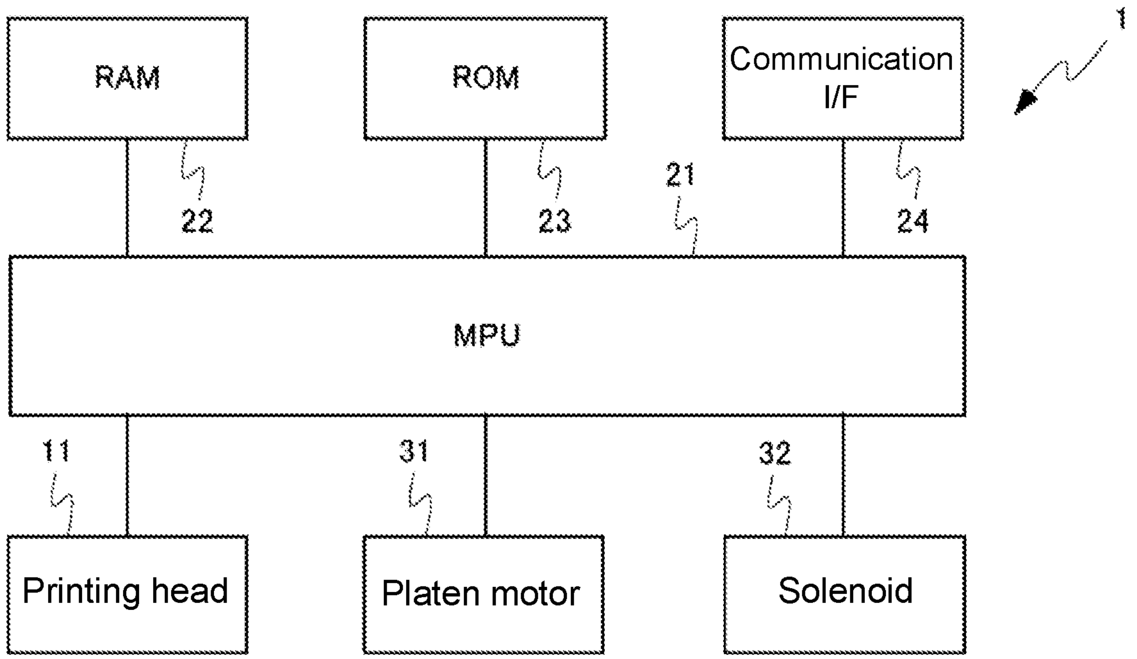
FIG. 10 is a block diagram showing a configuration of a control system for the printer according to the embodiment.

Configuration and operation of a control system for the printer according to the present embodiment will be described. FIG. 10 is a block diagram showing a configuration of the control system for the printer according to the present embodiment.

The printer 1 shown in FIG. 10 includes a processor and a memory. The processor is, for example, a micro processor unit (MPU) 21. The memory is, for example, a random access memory (RAM) 22 and a read only memory (ROM) 23. Moreover, the printer 1 further includes a communication I/F (interface) 24, a platen motor 31, and a solenoid 32.

The platen motor 31 drives the platen roller 12 to rotate. The solenoid 32 linearly moves the locking portion 161 so as to protrude from the guide portions 162 (see the state shown in FIG. 7) or so as to be stored in the guide portions 162.

The communication I/F 24 communicates with a superordinate device for the printer 1. The MPU 21 cooperates with the RAM 22, controls the printing head 11 and the platen motor 31, and forms (prints) an image received from the superordinate device on the label L. In addition, the MPU 21 sets the printer 1 on the linerless label printing mode or the label printing mode and performs state-switching processing to be described later. The ROM 23 stores programs and data used for the processing by the MPU 21.

(State-Switching Processing)

Figure 11:
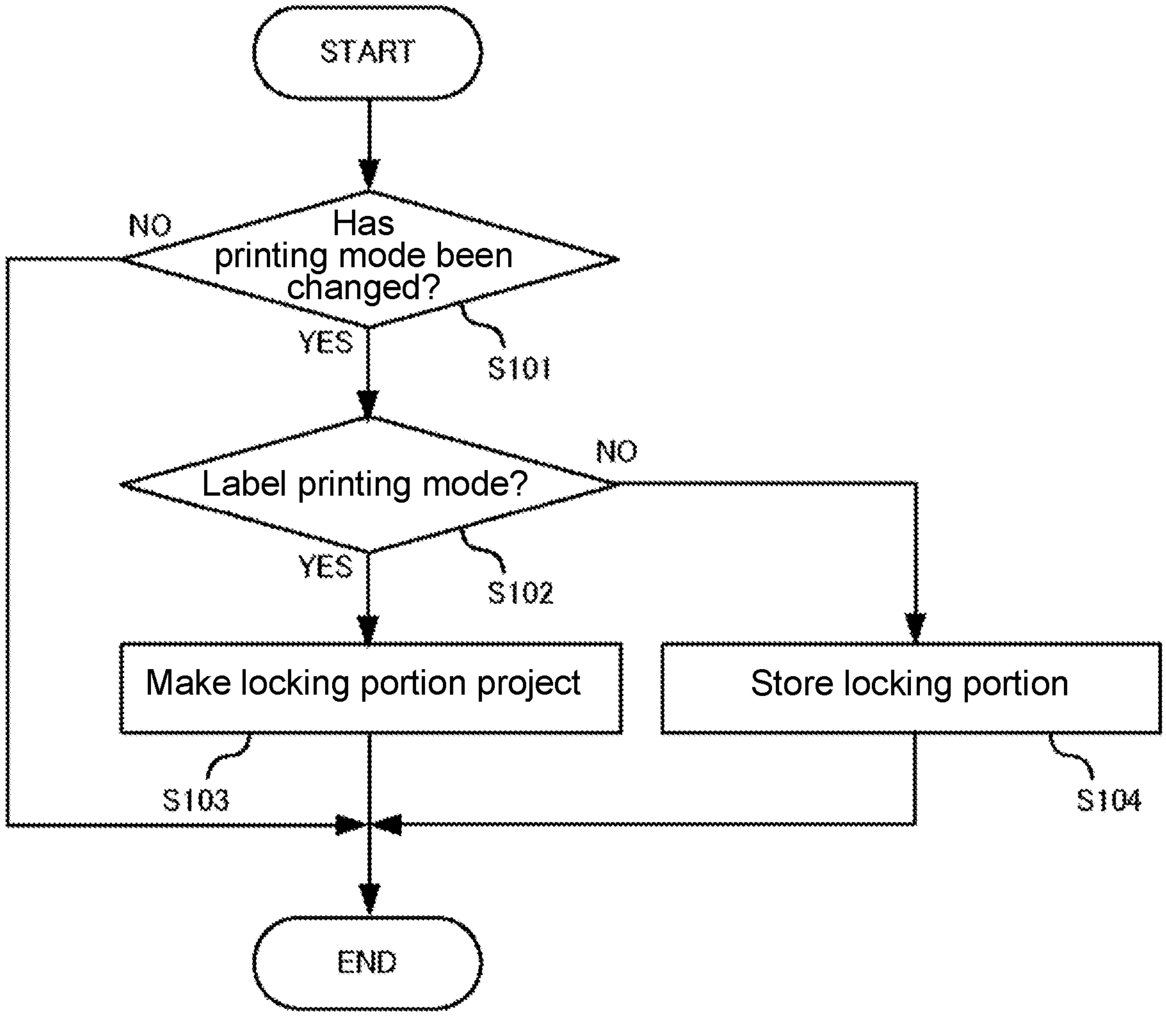
FIG. 11 is a flowchart showing state-switching processing according to the embodiment.

The state-switching processing of the MPU 21 (processor) will be described. FIG. 11 is a flowchart showing the state-switching processing according to the present embodiment. It should be noted that the processing shown in FIG. 11 is performed in each predetermined cycle.

As shown in FIG. 11, in Step S101, the MPU 21 determines whether or not the printing mode of the printer 1 has been changed. In a case where the MPU 21 determines that the printing mode has been changed (YES in S101), the processing of the MPU 21 proceeds to Step S102. In Step S102, the MPU 21 determines whether or not the printing mode has been changed to the label printing mode. On the other hand, in Step S101, in a case where the MPU 21 determines that the printing mode has not been changed (NO in S101), the MPU 21 terminates the state-switching processing shown in FIG. 11.

In Step S102, in a case where the MPU 21 determines that the printing mode has been changed to the label printing mode (YES in S102), the processing of the MPU 21 proceeds to Step S103. In Step S103, the MPU 21 controls the solenoid 32 to put the damper 15 in the limited state (e.g., see FIG. 9) so as to make the locking portion 161 project from the guide portions 162 (see FIG. 7). After putting the damper 15 in the limited state, the MPU 21 terminates the state-switching processing shown in FIG. 11.

On the other hand, in Step S102, in a case where the printing mode has not been changed to the label printing mode, i.e., in a case where the printing mode has been changed to the linerless label printing mode (NO in S102), the processing of the MPU 21 proceeds to Step S104. In Step S104, the MPU 21 controls the solenoid 32 to put the damper 15 in the unlimited state so that the locking portion 161 is stored in the guide portions 162. After putting the damper 15 in the unlimited state, the MPU 21 terminates the state-switching processing shown in FIG. 11.

In this manner, the printer 1 locks the damper 15 against a biasing force from the extension springs 159 so that no tensile force is applied to the base sheet S in order to put the damper 15 in the limited state. Therefore, in the printer 1, detachment of the label L due to the damper 15 can be prevented. It should be noted that although the locking portion 161 is configured to be moved by the solenoid 32 in the above-mentioned embodiment, the locking portion 161 may be configured to be manually moved by the user of the printer 1. Moreover, although the printer 1 is configured to perform printing in a photosensitive manner, the printer 1 may be configured to perform printing in another manner. Moreover, the damper 15 is not limited to one that swings, and for example, the damper 15 may be configured to linearly move the tip end portion for applying a tensile force to the base sheet S.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:

a printing head that prints a continuous sheet released from a roll around which the continuous sheet is wound;

a feed roller that conveys the continuous sheet via the printing head;

a damper that moves towards the continuous sheet and applies a tensile force to the continuous sheet on a conveying path for the continuous sheet conveyed by the feed roller;

a limiter that switches a state of the damper between an unlimited state in which a movement distance for the damper is not limited and a limited state in which the movement distance for the damper is limited so that no tensile force is applied to the continuous sheet; and a processor that performs control for driving the limiter to switch the damper in the limited state in a case where a label sheet with a label attached to a base sheet is used as the continuous sheet.

2. The printer according to claim 1, wherein the processor determines whether or not a mode to print the continuous sheet has been changed, in a case where the processor determines that the mode to print has been changed, the processor determines whether or not the mode to print is a label printing mode on which the label sheet is used, and in a case where the processor determines that the mode to print is a label printing mode, control for driving the limiter is performed to switch the damper to the limited state.

3. The printer according to claim 1, wherein the damper moves towards the continuous sheet and applies a tensile force to the continuous sheet on the conveying path on a more upstream side in the conveying direction than the printing head.

4. The printer according to claim 1, further comprising an extension spring that moves towards the continuous sheet and biases the damper so as to apply a tensile force to the continuous sheet.

5. The printer according to claim 4, wherein the limiter puts the damper in the limited state by engaging the damper against a biasing force caused by the extension spring.

6. The printer according to claim 1, wherein the limiter includes a locked portion provided in the damper and a locking portion that locks the damper by engaging with the locked portion.

7. The printer according to claim 6, wherein the locking portion is provided to be movable between a position at which the locking portion engages with the locked portion and a position at which the locking portion does not engage with the locked portion.

8. The printer according to claim 7, further comprising a solenoid moves the locking portion between the position at which the locking portion engages with the locked portion and the position at which the locking portion does not engage with the locked portion.

9. The printer according to claim 8, wherein the processor controls the solenoid to move the damper.

10. A printer, comprising:

a printing head that prints a continuous sheet released from a roll around which the continuous sheet is wound;

a feed roller that conveys the continuous sheet via the printing head;

a damper that moves towards the continuous sheet and applies a tensile force to the continuous sheet on a conveying path for the continuous sheet conveyed by the feed roller; and a limiter that switches a state of the damper between an unlimited state in which a movement distance for the damper is not limited and a limited state in which the movement distance for the damper is limited so that no tensile force is applied to the continuous sheet, wherein the limiter includes a locked portion provided in the damper and a locking portion that locks the damper by engaging with the locked portion, and the locking portion is provided to be movable between a position at which the locking portion engages with the locked portion and a position at which the locking portion does not engage with the locked portion.

11. The printer according to claim 10, further comprising a processor that performs control for driving the limiter to switch the damper in the limited state in a case where a label sheet with a label attached to a base sheet is used as the continuous sheet, wherein the processor determines whether or not a mode to print the continuous sheet has been changed, in a case where the processor determines that the mode to print has been changed, the processor determines whether or not the mode to print is a label printing mode on which the label sheet is used, and in a case where the processor determines that the mode to print is a label printing mode, control for driving the limiter is performed to switch the damper to the limited state.

12. The printer according to claim 10, wherein the damper moves towards the continuous sheet and applies a tensile force to the continuous sheet on the conveying path on a more upstream side in the conveying direction than the printing head.

13. The printer according to claim 10, further comprising an extension spring that moves towards the continuous sheet and biases the damper so as to apply a tensile force to the continuous sheet.

14. The printer according to claim 13, wherein the limiter puts the damper in the limited state by engaging the damper against a biasing force caused by the extension spring.

15. The printer according to claim 10, further comprising a solenoid moves the locking portion between the position at which the locking portion engages with the locked portion and the position at which the locking portion does not engage with the locked portion.

16. The printer according to claim 15, further comprising a processor that controls the solenoid to move the damper.

* * * * *